United States Patent [19]

Wise

[11] 3,945,683
[45] Mar. 23, 1976

[54] PRIORITY INTERRUPT CIRCUIT
[75] Inventor: Cecil S. Wise, Dallas, N.C.
[73] Assignee: Fiber Controls Corporation, Gastonia, N.C.
[22] Filed: Apr. 23, 1974
[21] Appl. No.: 463,431

Related U.S. Application Data

[60] Continuation-in-part of Ser. No. 250,248, May 4, 1972, Pat. No. 3,901,555, which is a division of Ser. No. 848,133, July 9, 1969, Pat. No. 3,671,078, and a continuation-in-part of Ser. No. 24,083, March 31, 1970, abandoned, which is a continuation-in-part of said Ser. No. 848,133.

[52] U.S. Cl.................................. 302/28; 302/42
[51] Int. Cl.² ........................................ B65G 53/66
[58] Field of Search.............. 302/28, 27, 11–13, 302/39, 42

[56] References Cited
UNITED STATES PATENTS

| | | | |
|---|---|---|---|
| 2,140,128 | 12/1938 | Craggs | 302/28 |
| 2,195,407 | 4/1940 | Craggs | 302/28 |
| 2,688,517 | 9/1954 | Riordan | 302/28 |
| 3,039,149 | 6/1962 | Lytton et al. | 302/28 |
| 3,099,492 | 7/1963 | Mortimer | 302/28 |
| 3,174,805 | 3/1965 | Mortimer | 302/28 |
| 3,414,330 | 12/1968 | Trutzschler | 302/28 |
| 3,649,082 | 3/1972 | Wise | 302/28 |
| 3,671,078 | 6/1972 | Wise | 302/28 |

Primary Examiner—John J. Love
Assistant Examiner—Jeffrey V. Nase
Attorney, Agent, or Firm—Cushman, Darby & Cushman

[57] ABSTRACT

Overfeed prevention method and apparatus operative during the purging of a pneumatic line which, between purges, conveys fiber material from a source to one or more of a plurality of stations. Whenever a station indicates a demand for fibers, control circuitry causes fibers to be supplied to that station and after all the demanding stations have been so supplied, the line is purged of fibers by operating at least one (preferably the last fed one) of only those stations which received fibers during a predetermined number of previous cycles to the exclusion of and thereby preventing the overfeed of any station that did not demand to be fed during that predetermined number of previous cycles. The stations have a priority sequence so that if, during the feeding of a given station, a station having a higher priority indicates a demand, the feeding of the given station is interrupted in favor of the station having the higher priority.

17 Claims, 2 Drawing Figures

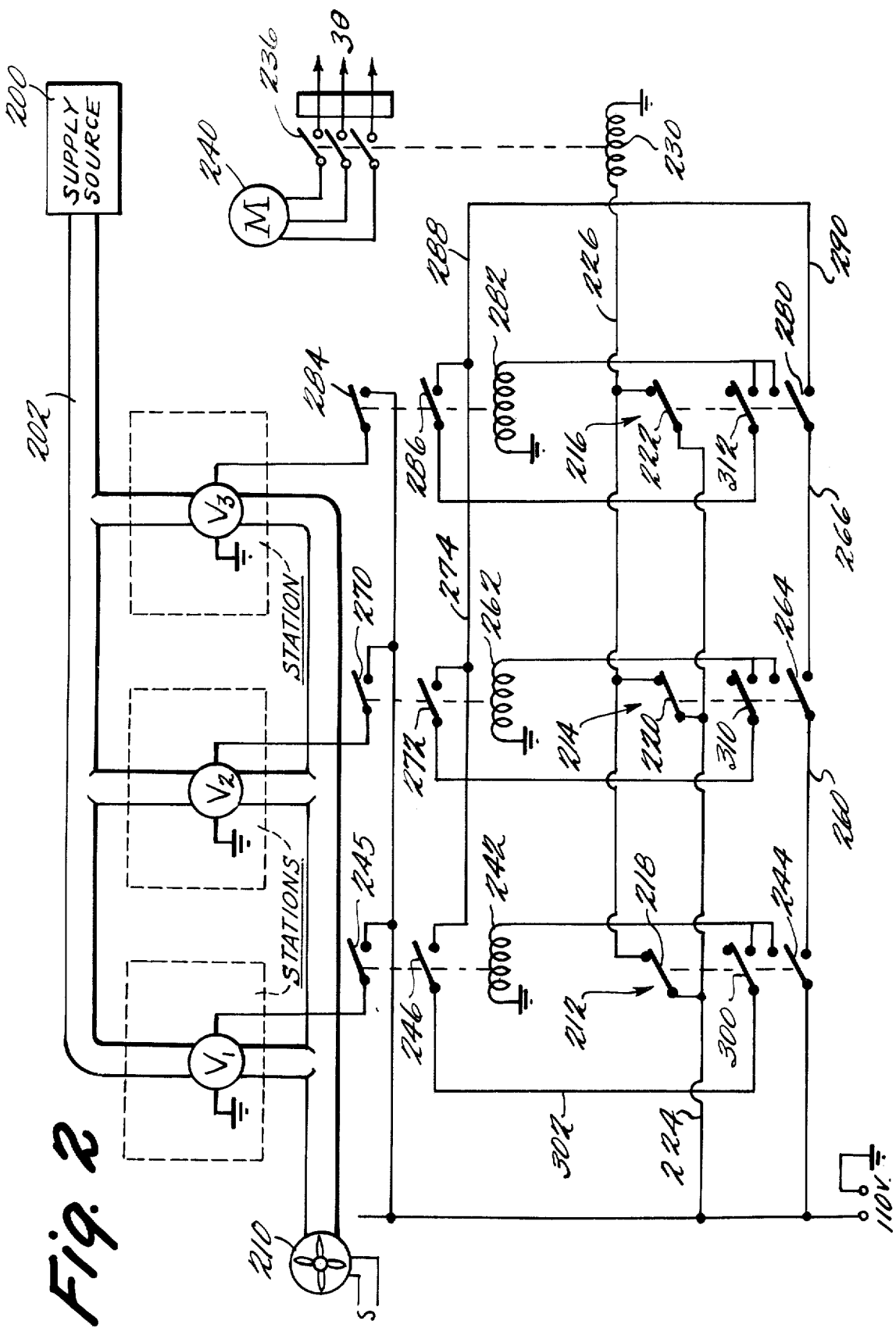

PRIORITY INTERRUPT CIRCUIT

This application is a continuation-in-part of Ser. No. 250,248 filed May 4, 1972, now U.S. Pat. No. 3,901,555, which is a divisional of Ser. No. 848,133 filed July 9, 1969, now U.S. Pat. No. 3,671,078. The application is also a continuation-in-part of Ser. No. 24,083 filed Mar. 31, 1970, now abandoned which is a continuation-in-part of the aforesaid Ser. No. 848,133 filed July 9, 1969, now U.S. Pat. No. 3,671,078.

BRIEF DESCRIPTION OF THE PRIOR ART AND SUMMARY OF THE INVENTION

The invention relates to an apparatus and method for preventing station overfeed during the purging of a pneumatic line which, between purges, carries fibers or other pneumatically distributable materials from a source to one or more of a plurality of stations connected to the line.

In textile mills, as well as in many other applications, there are many instances in which it is necessary to convey fibers and other such material from one processing point to another. One generally employed way to accomplish this conveyance is to entrain the fibers in an air stream which is confined within a pneumatic tube and drawn toward a fan or other device so that the entrained fibers can be separated from the air stream at their point of delivery by a distributor or separator such as a fiber condenser or like device. Suitable condensers or distributors are described in detail and claimed in Lytton et al. U.S. Pat. No. 3,039,149 (for example, FIG. 3 thereof in which an open-close exhaust line valve preferably replaces the exhaust fan assembly 68 as described in relation to FIG. 5 of the commonly owned C. Wise U.S. Pat. No. 3,649,082). The disclosures of these patents are explicitly incorporated herein by reference.

Usually, a plurality of such distributors, each associated with a machine which utilizes the conveyed fibers, for example for blending or the like are disposed at respective feeding points or stations along the line. Generally, each distributor, as described in the aforesaid application, includes an air intake channel for pulling the air stream and fibers into the distributor, a discharge channel for releasing the air stream without the fibers to an exhaust line, or to another line, a fiber outlet to a hopper or the like at the associated station, means within the distributor for separating the air stream and fibers and an actuatable on-off valve in the air discharge channel for causing the fiber laden air stream to be diverted into the air intake channel when the station requires fibers. The intake and discharge channels of each of the distributors are connected to the line or lines such that, if a valve at a station is not actuated, the stream of fiber laden air passes that station and proceeds to the next station. As described in the aforesaid patents and also in the commonly owned C. Wise U.S. Pat. No. 3,671,078, the disclosure of which is also explicitly incorporated hereinto by reference, each station includes means for sensing the material requirements of that station and each station's fiber demands are satisfied by operation of electrical control circuitry which actuates the valves of the respective demanding stations.

After all of the stations indicating demand have been served in sequence, then it is desirable to purge the pneumatic tube through which the entrained fibers pass in order to prevent the tube from clogging with fibers that drop during distribution. This has been accomplished in the past by simply deenergizing the motor causing the source to supply fibers to the line and then opening the valves of all of the stations associated with the line, whether or not they have just received fibers, so that the fiber remaining in the line is drawn into one or more of the stations. After this short purging period which follows each cycle in which all stations indicating demand are satisfied, the control circuit returns to its initial state and, in response to fiber demands by one or more of the stations, starts a new cycle, serving each of the requesting stations and then again purging the line in the same fashion.

While that purging arrangement has ben generally quite satisfactory, there are times when certain stations undesirably become overfed, for several reasons. First, the fan or other device normally tends to pull the fibers remaining in the pneumatic line into the one station closest to the fan. Further, if any station is not currently using the fibers and is full, and particularly if that station happens to be closest to the fan, it will receive additional fibers each time that purging takes place and an undesirable overfill at the station will eventually be the result. In practice, it is not uncommon for a temporarily unneeded station, e.g., a picker, to be turned off for a time, but yet its fiber input valve normally reopens during purging. While such a station may be able to handle the resulting overfill without too much of a problem for a few purging cycles, e.g., 3 to 5 cycles, greater overfill is generally intolerable, and even in some situations requiring more accuracy one overfill may be highly undesirable. The longer the pneumatic tube connecting the source to the stations, the greater is the overfill problem since a greater volume of material is left in the tube after each cycle.

The present invention overcomes this overfill problem by only opening during purging those valves which are associated with stations which received fiber during the cycle just completed or within some given number of past cycles, for example within the last three cycles. Circuitry associated with each of the stations determines whether it has received fibers during the last cycle or during any chosen number of previous cycles, for example, three. In one of the embodiments described in detail below this is accomplished by charging a capacitor which discharges slowly during feeding, so that a relay is maintained in an activated state by the capacitor, either until the purge of that cycle has been completed or any given number of purges have occurred. In the other embodiment, the switches associated with the structure indicating demand are arranged such that one connection to a line, which is connected to an electrical source when all stations have been satisfied, is made before a second disconnection takes place. In this other embodiment, the last station served is purged and purging continues until one of the stations indicates a demand for more fibers, initiating a new cycle.

In each of the embodiments of this invention, the stations are fed one at a time and in a given priority. However, whenever during a cycle a given station is being fed and a station having a higher priority indicates demand, the feeding of the given station is interrupted in favor of the station having a higher priority.

Many other objects and purposes of the invention will become clear from the following detailed description of the drawings.

BRIEF DESCRIPTION OF THE DRAWINGS

FIG. 2 shows control circuitry of a second embodiment.

DETAILED DESCRIPTION OF THE DRAWINGS

Figure 1:
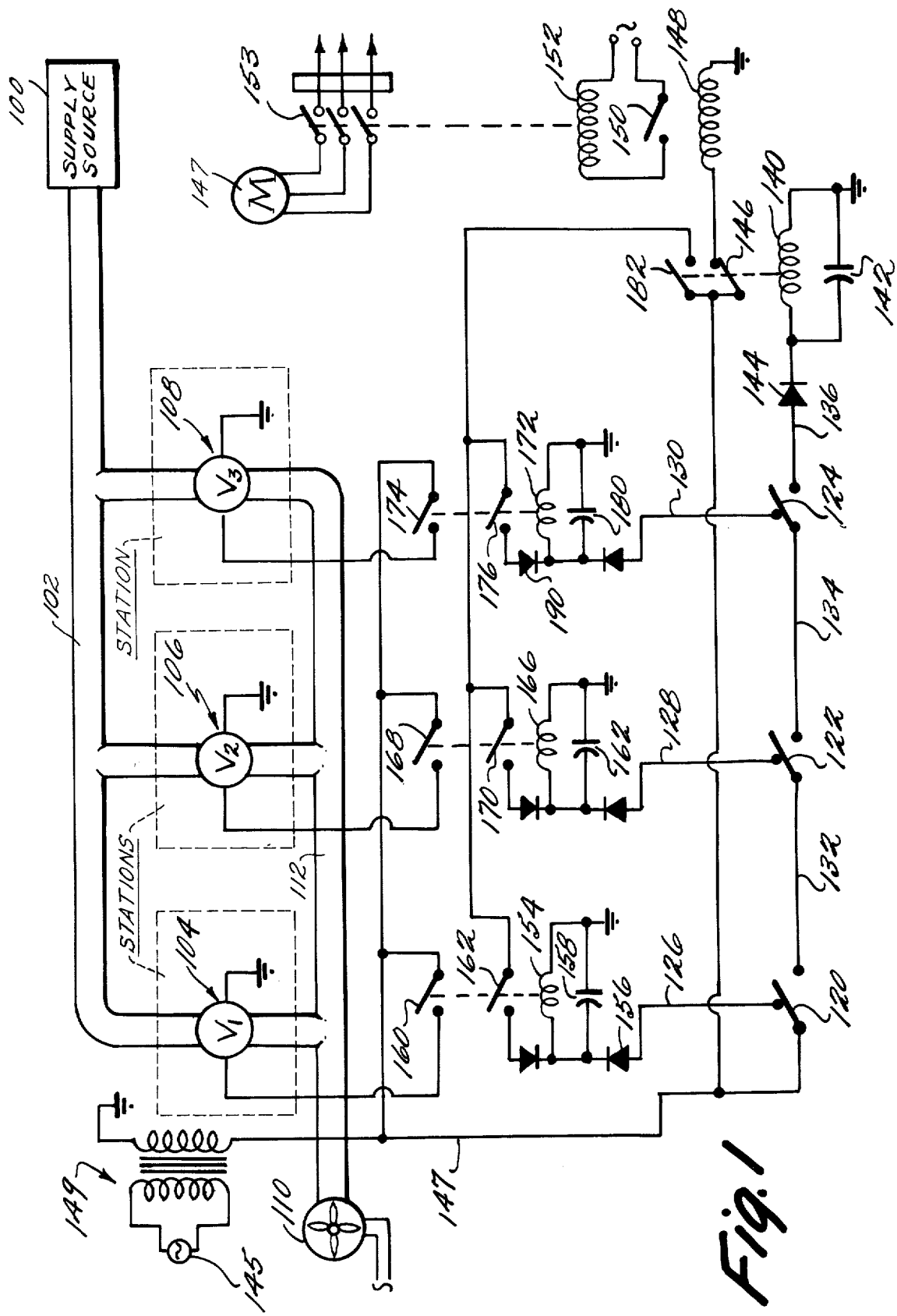
FIG. 1 shows control circuitry of a first embodiment whereby the system will interrupt the feeding of a station in favor of a demanding station having a higher priority.

Reference is first made to FIG. 1 which illustrates a control system for controlling the supply of fibers to a plurality of fiber stations connected to a supply source by a pneumatic tube. Source 100 supplies entrained fibers to a line 102 to which are connected stations 104, 106, and 108, having valves $V_1$, $V_2$ and $V_3$ respectively associated therewith for the removal of fibers in the same way as briefly described above. A fan 110 or like device is attached to the return line 112 and the entrained fibers are drawn through the tube 102 toward fan 110 and through valves $V_1$, $V_2$ and $V_3$ which are successively opened one at a time to withdraw the fibers. Valves $V_1$, $V_2$, and $V_3$ together with fan 110 function as extracting means.

The arrangement shown in FIG. 1 has a builtin priority, i.e., the circuitry is designed to serve stations associated with the pneumatic line in a set order and to interrupt the feeding of an unsatisfied station at any time in favor of another station having a higher priority that is also demanding fibers. Further, the arrangement shown in FIG. 1 is also designed to deal, at least partially, with the problem of overfeed which can result as discussed above if any of the stations attached to the line 102 is not removing the fibers which are deposited therein during each purge. Since the station closest to fan 110 normally receives the bulk of the fibers which are purged at the end of each cycle, this station in particular is susceptible to being overloaded. The circuitry shown in FIG. 1 solves this problem by only opening, during purging, the valve or valves of the station or stations actually served during the cycle just completed or some previous number of cycles. Preferably, only the last station actually served during the cycle just completed is opened to purge line 102. Thus if a station does not receive fibers during a cycle, it cannot receive fibers during purging and it cannot be overfed.

The arrangement in FIG. 1 employs level control or rake switches 120, 122 and 124 which connect to line 126, 128 and 130, respectively, when a demand condition exists and connecting to lines 132, 134 and 136 when the station associated therewith does not want fibers. These switches thus indicate demand. Thus, if any of the switches 120, 122 or 124 are in the illustrated demand positions, feed relay 140, which has a capacitor 142 connected in parallel with it and a diode 144 connected in series with it to rectify the current from the alternating current source 145 which is coupled to line 147 by conventional transformer 149, is deactivated, permitting switch 146 which it controls to resume its normally closed position and switch 182 its normally open position. The closing of switch 146 in turn activates relay 148 which in turn closes normally open switch 150, activating relay coil 152. The activation of relay coil 152 closes switches 153, completing a current path through feed motor 120 which then causes fibers to be entrained from source 100 into line 102. Relay 152 and the circuitry which operates it thus causes the source 100 to supply material to line 102 whenever one of the indicating means, comprising switches 120, 122 or 124, indicates demand and to continue to supply material until the cycle ends.

In the arrangement of FIG. 1, the priority of stations receiving fibers is from left to right with the station 104 having the highest priority, the station 106 having the second highest priority, and the station 108 having the lowest priority. It should be apparent that priority can be assigned any stations in any way desired, although stations are normally served beginning with those furthest from the source. Thus in this embodiment, assuming the station 104 is demanding fibers, it is served first as follows. The relay 154 is activated by the current flowing through the switch 120 and line 126 rectified by the diode 156. A capacitor 158 is connected in parallel with the relay 156 and is quickly charged to provide a D.C. voltage across relay 154 to cause the closing of first controlled switch 160 and second controlled switch 162. The closing of switch 160 completes of switch 1060 completes a current path through valve $V_1$ which then opens and diverts the entrained fibers in line 102 through station 104 as described above. Thus relay 154 and the associated circuitry comprises operating means for effectively checking the station, and causing fibers to be supplied if that station has the highest priority. The closing of second controlled switch 162 is in preparation for the purge of the system as described below should relay 154 still be activated when the cycle ends.

When the demand of station 104 has been satiated, and assuming station 106 is demanding fibers, the shifting of rake or level control switch 120 into connection with line 132 completes a current path via switch 122 through the relay coil 166 of the next station to receive fibers, namely station 106. Relay 166 then closes switches 168 and 170 in the same manner as relay coil 154, completing a path through the valve $V_2$ and also preparing for the purge. When station 166 has been satisfied, switch 122 shifts into connection with line 134 and relay 172 of the station 108 is next activated to close switches 174 and 176 and complete a current path through valve $V_3$ and prepare for a purge provided that switch 124 is in its demand position.

The system of FIG. 1 provides that should a station having a higher priority exhibit a demand for fibers when another station is being served, the system will skip back to the higher station and satisfy its demands. For example, if the station 108 is being served, but is not satisfied, and the switch 120 returns into connection with line 126 indicating a demand at station 104, relay 172, after a very short time period during which the capacitor 180 discharges, is deactivated, cutting off the current path through valve $V_3$ which then closes. At the same time, relay 154 is reactivated, closing switches 160 and 162 so that the valve $V_1$ is again opened to remove fibers. After the station 104 has again been satisfied, switch 120 shifts again into connection with line 132 and once again the system serves the next station demanding fibers in the priority sequence.

When the complete cycle has been finished, all of the rake or control level switches 120, 122 and 124 have shifted to their satisfied, non-demand positions in connection with line 132, 134 and 136 respectively, creating a current path through relay 140 preventing the feeding of material to line 102 while purging continues which constitutes a second relay having a coil which charges capacitor 142 and opens normally closed switch 146, which in turn cuts off the energy supplied to feed motor 147. The purging operation now takes place and the charged capacitor 142 causes relay 140 to remain activated for a short time sufficient for purging even should one of the rake or control switches 120, 122 or 124 shift during purging indicating a demand. Relay 140 and the associated circuitry thus comprise overfill protection means. The activation of relay 140 also closes the normally open switch 182, completing a current path through those of the coils 154, 166 and 172 constituting first relays which are still held activated by the associated charged capacitor and which will normally be the coil of the last station actually served during the cycle.

The values of the capacitors 158, 162 and 180 associated with the relays 154, 166 and 172 are carefully chosen so that the discharge rate will be such to keep the coil with which it is associated activated for only a short time after the current path through the relay is interrupted, and the discharge time is usually designed to be short enough so that by the time purging takes place all of the relays will be deactivated except the one which was served last. Of course, if the last station was served very quickly it is possible that more than one relay will be still activated during purging. However, a relay associated with a station which did not receive fibers during the cycle obviously could not still be activated.

Thus, if station 108 is served last, which it normally would be, then, at the end of the cycle, the capacitor 180 will still be sufficiently charged to maintain relay 172 activated when switch 182 is closed completing a new path through relay 172 via switch 176 and diode 190. Valve $V_3$ thus remains open during purging, and this valve will be the only one open during purging. Since the last station to be actually served during any cycle is normally the one through which purging takes place, the problem of over feeding is resolved.

Reference is now made to FIG. 2 which illustrates a schematic for control circuitry for a further embodiment of this invention. As for the embodiment of FIG. 1, the circuitry of FIG. 2 functions to control the supply of fibers or some similar material from a source 200 to each of a plurality of stations respectively associated with devices for removing the fibers from line 202, those devices schematically illustrated as valves $V_1$, $V_2$ and $V_3$. A fan 210 is disposed at the end of the fiber distributing line 202 for creating a vacuum to draw the entrained fiber materials along line 202 so that the material can be removed by any of valves $V_1$, $V_2$, and $V_3$ which are activated as discussed below.

Also in the same fashion as the circuitry of FIG. 1, the arrangement of FIG. 2 checks each of the stations in the system in a given sequence, following an indication by any one of the stations of a demand for fiber material. If, during checking of the stations, a station having a higher priority indcates a demand for fibers, the system will cease feeding the station having lower priority and skip to the station having higher priority until its demands have been met at which time checking of the stations resumes. When all of the station demands have been met, line 202 is purged of excess fibers and the purging is limited to those stations which have been operated during a pre-determined number of previous cycles. In particular, in the arrangement of FIG. 2 the last station which is served in a cycle is held open during purging. This is accomplished by the use of switches associated with the structure at each station which indicates demand so that one of the switches associated therewith is connected to a line as discussed below before another switch is disconnected from another line. In the arrangement of FIG. 2, purging of the last station served in a cycle continues until one of the stations in the system indicates a demand for fibers at which time checking and supply of the stations as discussed below resumes. Since the system is normally designed such that supply of fibers to stations takes place practically continuously, purging of the last station in the cycle will normally not occur for more than a few minutes at most.

A cycle is initiated when any of the stations respectively associated with valves $V_1$, $V_2$, or $V_3$ indicates a demand by shifting its controlled switches 212, 214, or 216 respectively from their illustrated positions. Second switch 218 of switches of 212, second switch 220 of switches 214, and second switch 222 of switches 216 each connect, in parallel, line 224 to line 226. Line 224 is connected to the "hot" terminal of a conventional A.C. voltage source, while line 226 is connected to one side of a conventional relay 230 with the other side of relay 230 being connected to ground so that whenever any of the switches 218, 220, or 222 are in their illustrated position indicating that the associated station demands fiber, a current path is completed through relay 230 which closes its controlled switches 236 completing a current path to feed motor 240 which causes fibers to be entrained in feed line 202 and transmitted through that line to be sequentially removed by the valves associated with stations demanding fiber.

Assuming the station associated with valve $V_1$ is demanding fiber and accordingly its associated switches 212 are in their illustrated position, a current path is completed through relay coil 242 via switch 244 of switches 212. Coil 242 responds by shifting its controlled switches 245 and 246 away from their illustrated positions. The shifting of switch 244 completes an electrical connection through valve $V_1$ which is thus activated to withdraw fibers from line 202 in a fashion which is discussed in greater detail in the above-mentioned Wise patents.

Valve $V_1$ is kept activated until the switches 212 shift from their illustrated position indicating that the demand of the station associated with valve $V_1$ has been met. Switches 212 can be associated with level control or rake switches in the stations which detect when the fibers in that station have accumulated to a predetermined level. The shifting of switch 244 from its illustrated position into connection with line 260 now completes a current path through relay coil 262 via switch 264 of switches 214, assuminng that switches 214 are in their illustrated position indicating that the station associated with $V_2$ is demanding fibers. If such is not the case, then switch 264 will be in electrical connection with line 266 and the circuitry will continue the checking of the stations until it encounters a station which is demanding fibers.

If the station associated with valve $V_2$ is demanding fibers then the activation of relay coil 262 closes switch 270, completing a current path through valve $V_2$ which is activated to withdraw fibers from line 202. Switch 272 is also shifted from its illustrated position into electrical connection with line 274.

When the station associated with valve $V_2$ has been satisfied, switches 214 shift from their illustrated position so that switch 264 is now in electrical connection with line 266, completing a current path via switch 244, line 260 switch 264 line 266, and switch 280 of switches 216 through relay coil 282 which responds by closing its controlled switch 284 completing a current path through valve $V_3$ and also shifting its controlled switch 286 into connection with line 288.

When the station associated with valve $V_3$ has been satisfied, switch 280 shifts away from its illustrated position into electrical connection with line 290. Since in this particular embodiment three stations are illustrated, the checking and, if required, the servicing of the station associated with valve $V_3$, completes the checking of each of the stations in the system and line 202 is now purged of excess fibers.

Since each of the stations have now been served and are not demanding fibers, line 188 is connected to the hot terminal via switches 280, 264, and 244. Each of the switches 212, 214, and 216 are arranged such that relay coil 282 is coupled to line 288 electrically before the connection via switch 244, 264, or 280 to the hot terminal is broken. Thus if line 288 is already electrically connected to the hot terminal, relay 242, 262, or 282 is kept activated, keeping its controlled switch 245, 270 or 280 respectively in the closed position so that the respectively associated valve $V_1$, $V_2$ or $V_3$ is maintained activated to purge line 202.

First switch 300 of switches 212 is arranged so as to electrically connect line 302 to relay coil 242 before that relay 242 is disconnected from the hot terminal by the shifting of third switch 244. This is simply a matter of arranging the physical locations of the contacts. Thus if the station associated with valve $V_1$ is the last station to be served in the cycle, then, when the switches 212 shift away from their illustrated positions, relay coil 242 will be connected to the hot terminal via switch 300 and line 302 before it is disconnected from the hot terminal by the opening of switch 244. Similarly, first switch 310 of switches 214 is arranged to electrically connect relay coil 262 to line 274 and the hot terminal via third switches 280, 264, and 244 before relay coil 262 is disconnected from the hot terminal via switch 264. Similarly first, switch 312 of switches 216 is arranged to connect relay coil 282 to line 288 before relay coil 282 is disconnected from the hot terminal by the shifting of switch 280.

The circuitry illustrated in FIG. 2 also operates on a "priority interrupt" basis halting the checking of stations at any time that a station having a higher priority indicates a demand for fibers. For example, if the circuitry were serving the stations associated valve $V_3$ and switches 212 shifted into their illustrated position the current path to relay coil 282 via switch 244 would be broken and the switch 284 would return to its illustrated position deactivating valve $V_3$. The shifting of switch 244 similarly completes a current path through coil 242 activating valve $V_1$ and withdrawal of fibers at that valve via line 202 continues until the demand of the station associated with valve $V_1$ has been satisfied. The station associated with valve $V_1$ in the arrangement of FIG. 2 has the highest priority while the station associated with valve $V_3$ has the lowest priority. It will be understood that the priority can be arranged as desired although normally the stations would be fed beginning with the station furthest from the supply source.

Many changes and modifications in the above described embodiments of the invention can of course be carried out without departing from the scope of the claims of the invention. Accordingly, that scope is intended to be limited only by the scope of the attached claims.

What is claimed is:

1. Control circuitry of controlling the feeding of material from at least a single source to a plurality of stations having a set priority for receiving said material so as to prevent overfeed of any one or more of said stations during the purging of at least a single pneumatic line connecting said source and stations at the end of a cycle which begins when at least one of said stations indicates a demand and ends after at least those stations indicating a demand at the beginning of that cycle have had their demand satisfied, each station having operable means for extracting said material from said line and means for indicating a demand or no demand for said materials, comprising:

means for causing said source to supply said material to said line when at least one of said indicating means indicates a demand for said material and to continue to supply said material to said line until the end of said cycle, first operating means for effectively checking each of said indicating means and operating the said extracting means associated with an indicating means indicating a demand for said material when checked whenever all stations of said plurality of stations having a higher priority are not indicating a demand for fibers and for interrupting the feeding of a station whenever a station having a higher priority indicates a demand and for operating the said extracting means of said station having a higher priority, and overfill prevention purging means operative after operation of said first operating means for operating at least one of only the said extracting means operated by said first operating means during the last predetermined number of operations thereof for purging said line and effectively preventing overfeed of any station whose associated extracting means was not operated by said first operating means during the said last predetermined number of cycle operations thereof.

2. Circuitry as in claim 1 wherein said purging causing means includes relay means associated with each station so as to shift from a first to a second condition whenever said indicating means indicates a demand for said material, capacitor means connected in parallel with each said relay means for maintaining said relay means in said second condition for a given time after said indicating means no longer indicates a demand for said material and means for causing all of said extracting means which are associated with a station having said relay means in said second condition to operate after the end of each said cycle to purge said line.

3. Circuitry as in claim 1 including diode means associated with each said capacitor for supplying D.C. voltage to said capacitor.

4. Circuitry as in claim 1 including means for preventing said source from feeding said material to said line while said purge is continuing.

5. Circuitry as in claim 1 wherein each said extracting means includes valve means for diverting said material into said station whenever current flows through said valve means, and including second relay means which shift from a first to a second condition when a supply of current is connected to said second relay means after said cycle is completed so as to cause current to flow through the valve means of those stations having first relay means in said second condition.

6. Circuitry as in claim 5 including capacitor means connected in parallel with said second relay means for retaining said second relay means in said second condition for a short time after said coil means is disconnected from said current supply.

7. Circuitry as in claim 6 wherein each said indicating means is a switch having a first position indicating demand and a second position indicating no demand and wherein said second relay means is connected to said current supply via the serial connection of all of said switches when all of said switches are in said second condition.

8. Circuitry as in claim 1 wherein said purging causing means includes means for operating at the end of said cycle the last operating means operated during that cycle until one of said indicating means indicates a demand for fibers.

9. Circuitry as in claim 1 wherein said purging causing means includes relay means associated with each station and having a first controlled switch for connecting the operating means to a source of electrical potential when that relay means is activated and a second controlled switch for connecting that relay means to a line and wherein each said indicating means includes switch means associated with each said station switch means having a first position indicating no demand so that said source is connected to said line when none of said stations are demanding fibers and connecting the relay means of that station to said source when no station having a higher priority is indicating a demand for fiber material and a second position indicating demand so that said source is connected to said fiber supply causing means when any of said stations are demanding fibers and in said first position connecting said relay means to said line via said controlled switch when that station is not demanding fibers, each said switch means being arranged such that when said switch means shifts from said second to said first position, said relay means is connected to said line before said relay means is disconnected from said source.

10. Circuitry as in claim 9 wherein said switch means each include a first switch serially connected with said relay means and said second controlled switch and being closed in said first position, a second switch connected in parallel with the second switches of the other switch means and connecting, in said second position, said electrical source to said fiber supply causing means and a third switch serially connected in said first position to connect, with said other third switches, said electrical source to said line and connecting in said second position said relay means to said electrical source via said third switches of stations having a higher priority.

11. Control circuitry of controlling the feeding of material from at least a single source to a plurality of stations to prevent overfeed of any one or more of said stations during the purging of at least a single pneumatic line connecting said source and stations, each station having operable means for extracting said material from said line and means for indicating demand or no demand for said material, comprising:

means for causing said source to supply said material to said line when at least one of said indicating means indicates a demand for said material, first operating means for effectively checking said indicating means and operating the said extracting means associated with an indicating means indicating a demand for said material, and overfill prevention purging means including relay means which is connected to a current supply after operation of said first operating means so as to be activated and to cause at least one of only the said extracting means operated by said first operating means during the last predetermined number of operations thereof to purge said line and thus effectively prevent overfeed of any station whose associated extracting means was not operated by said first operating means during the said last predetermined number of operations thereof, and including capacitor means connected in parallel with said relay means for maintaining said relay means activated for a short time after said relay means is disconnected from said supply means.

12. Control circuitry of controlling the feeding of material from at least a single source to a plurality of stations to prevent overfeed of any one or more of said stations during the purging of at least a single pneumatic line connecting said source and stations, each station having operable means for extracting said material from said line and means for indicating a demand or no demand for said material, comprising:

means for causing said source to supply said material to said line when at least one of said indicating means indicates a demand for said material, first operating means for effectively checking said indicating means and operating the said extracting means associated with an indicating means indicating a demand for said material, and overfill prevention purging means including relay means which is connected to a current supply after operation of said first operating means so as to be activated and to cause at least one of only the said extracting means operated by said first operating means during the last predetermined number of operations thereof to purge said line and thus effectively prevent overfeed of any station whose associated extracting means was not operated by said first operating means during the said last predetermined number of operations thereof, and including switch means connected to said relay means for maintaining said relay means associated with the last station supplied in a cycle activated after said relay means is disconnected from said supply means.

13. A control apparatus for a material distribution system having pneumatic means for conveying fiber material, entrained in an air stream and supplied to that air stream from at least one source, to a plurality of stations having a set priority for receiving said fiber material, switch means at each station for indicating a demand for said fiber material having a first position indicating demand and a second position not indicating demand, and means at each station and associated with said indicating means for removing said fiber material from said air stream with said entrained fiber material when a source of electrical energy is applied to said removing means comprising:

means for causing said material source to supply said fiber material to said air stream whenever one of said indicating means indicates a demand for said fiber material, a source of electrical energy, relay means associated with each said station having coil means actuated by connection to said energy source when said switch means of that station is in said first position and the switch means of all other stations having a higher priority are a said second position, switch means associated with each said coil means and controlled by said coil means for connecting said removing means to said energy source when said coil means is activated, capacitive means associated with each said coil means and connecting in parallel with said coil means for retaining said coil means activated after said coil means is disconnected from said energy source, means for purging said pneumatic means, after all of said stations demanding fiber material have been satisfied, through all the stations having said coil means retained activated after all of said stations demanding fiber material have been satisfied, and means for preventing said causing means from causing said fiber material source to apply fiber material to said air stream during purging.

14. An apparatus as in claim 13 wherein said preventing means includes second relay means having coil means activated by connection to said energy source when the switch means of all of said stations are in said second position, second switch means associated with said coil means of said second relay means and controlled by said coil means of said second relay means so as to be shifted to a position which prevents said causing means from causing said fiber material source to supply fiber material to said air stream when said coil means of said second relay means is activated and further including:

second switch means associated with said coil means of said second relay means and controlled by said coil means of said second relay means so as to be shifted from a first to a second position when said coil means of said second relay means is activated, second switch means associated with each said coil means of said first relay means and controlled by said coil means of said first relay means for connecting said coil means of said first relay means to said energy source when said second switch means associated with said coil means of said second relay means is in said second position, and second capacitive means connected in parallel with said coil means of said second relay means for retaining said coil means of said second relay means activated after said coil means of said second relay means is disconnected from said energy source.

15. A method of feeding material from at least a single source to a plurality of stations having a set priority for receiving said material so as to prevent overfill of any said station during purging of at least a single pneumatic line connecting said source and stations, each station having means for extracting said material and means for indicating demand and no demand for said material comprising the steps of:

supplying material to said line whenever at least one of said indicating means indicates a demand for said material, operating one at a time in an order determined by said set priority said extracting means of each of said stations having an indicating means indicating a demand for said material when checked and when all stations of said plurality of stations having a higher priority are not indicating a demand for fibers so that a cycle is completed after all of said indicating means indicate no demand for said material, interrupting the feeding of a station whenever a station having a higher priority indicates a demand and operating the said extracting of said station having a higher priority, and operating after the completion of each cycle, one of only the said extracting means operated within a given number of past cycles so as to purge said line.

16. A method as in claim 15 including the step of preventing said material from being supplied to said line during said purge.

17. A method as in claim 15 including the step of charging capacitor means while said extracting means is operated so that said capacitor means retains relay means associated with each said capacitor means and which, when activated, cause said extracting means to operate activated for a given time after the operation said extractor means is ended and so that the said extracting means having relay means activated are operated during said purge.

* * * * *